Jan. 30, 1968
L. J. KREFT
3,365,834
FISHING APPARATUS
Filed July 19, 1965
2 Sheets-Sheet 1
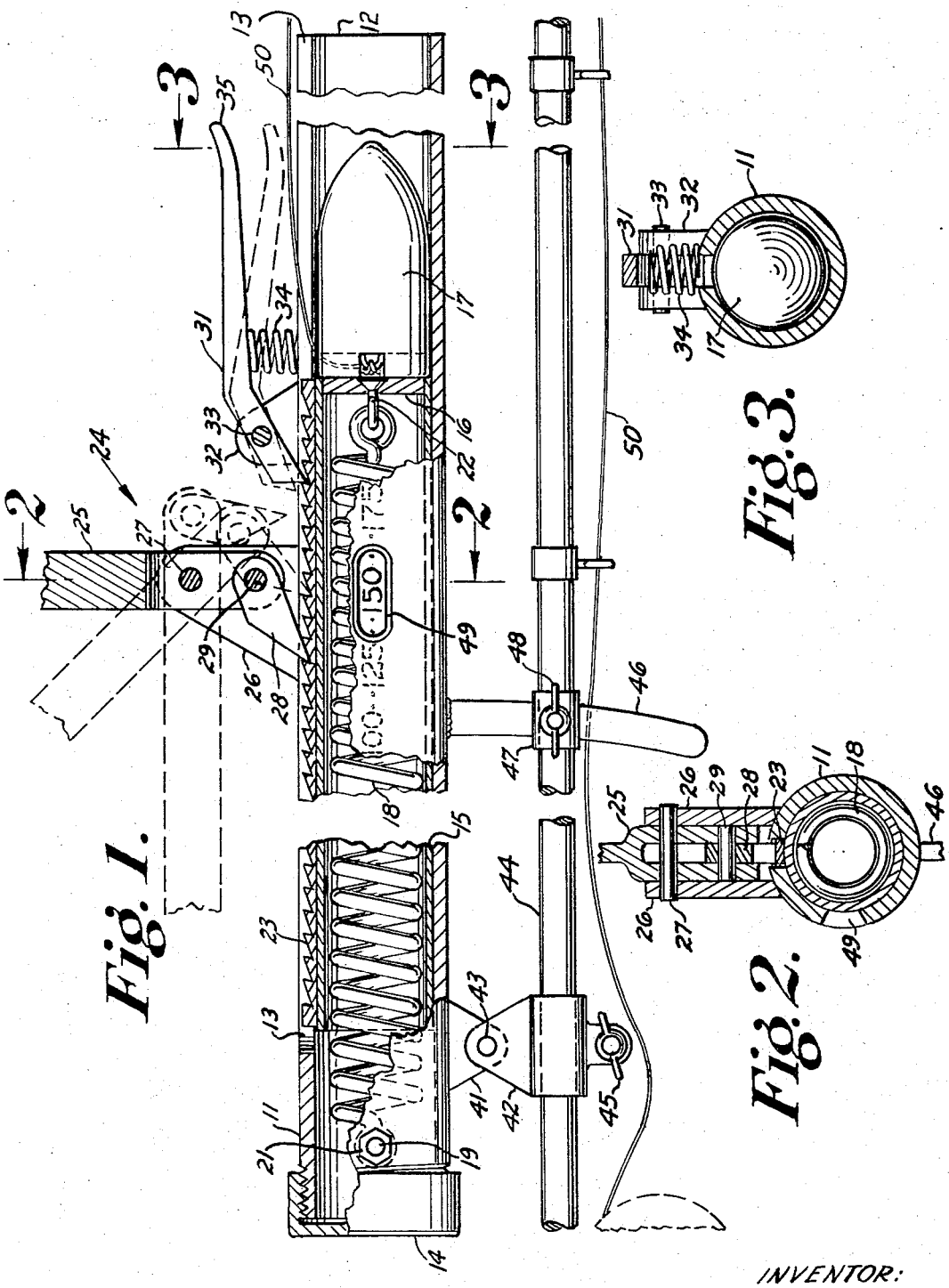
INVENTOR:
Leon J. Kreft.
BY John E. Toupal
ATTORNEY.

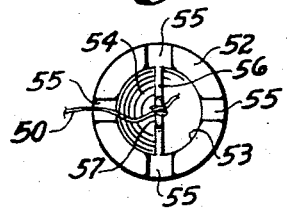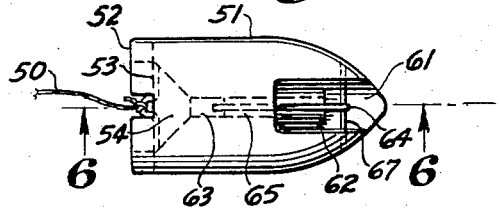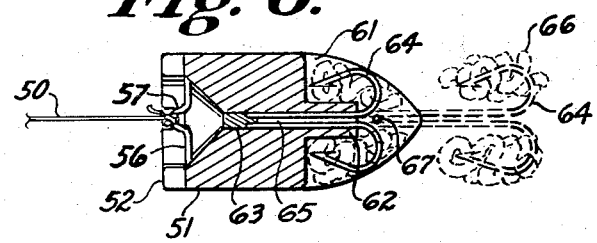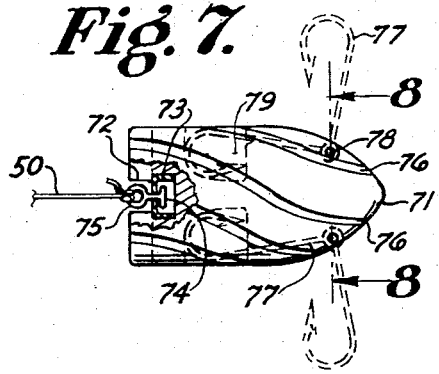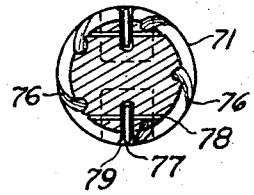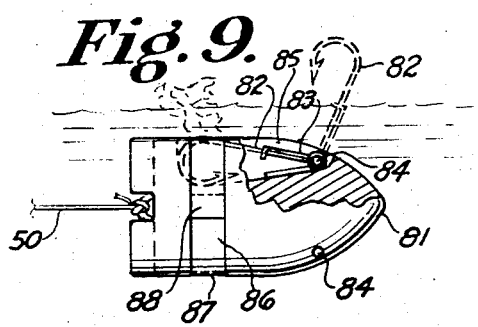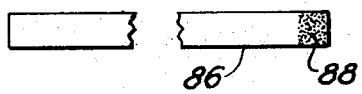

United States Patent Office 3,365,834
Patented Jan. 30, 1968

3,365,834
FISHING APPARATUS
Leon J. Kreft, 28 Carlton St., Shrewsbury,
Mass. 01545
Filed July 19, 1965, Ser. No. 472,960
20 Claims. (Cl. 43—19)

ABSTRACT OF THE DISCLOSURE

A fishing lure casting apparatus having a compressible spring mechanism for expelling a line attached lure from a longitudinally slotted tubular housing. An actuator engages the spring mechanism during compression thereof but is disengaged during the expulsion stroke.

This invention relates generally to fishing apparatus and more particularly to a device for automatically casting a fish lure.

An important step in most fishing operations is the casting of a fish lure into a selected area of fishing water. Frequently a suitable cast is difficult if not impossible to obtain. For example, when fishing in large bodies of water such as lakes, bays, oceans, etc., a cast is frequently desired which is longer than is obtainable by the average fisherman. Such a lengthy cast would enable the fisherman to cast beyond such obstructions as reefs, breakers, weeds, etc. Similarly, when fishing in waters closely abutted by dense underbrush and forests it is frequently difficult to manipulate the fishing rod in the normal manner for obtaining a relatively long and accurate cast.

Fish lure casting devices of various types have been developed in an attempt to overcome these problems. However, all have exhibited either common or individual disadvantages which have prevented their commercial acceptance and success. The disadvantages have included bulky and cumbersome designs, unwieldy actuating mechanisms, high cost, susceptability to failure, etc.

The object of this invention, therefore, is to provide a reliable low cost apparatus which will permit a fisherman to safely, easily and accurately cast a fishing lure for relatively long distances and into confined areas.

One feature of this invention is the provision of a fishing lure casting device having a tubular housing with an elongated longitudinal slot adapted to accommodate a fishing line and a ratchet operated spring mechanism for propelling a fishing lure inserted into the tubular housing.

Another feature of this invention is the provision of a lure casting device of the above featured type wherein a coil spring is attached to an elongated ratchet and including a lever operated driving pawl for actuating the ratchet and a biased trigger pawl adapted in a norml position to prevent forward motion of the elongated ratchet and in a release position to release the ratchet and attached coil spring.

Another feature of this invention is the provision of a lure casting device of the above featured types wherein the elongated ratchet is attached to the outer surface of a hollow cylinder which partially encloses the coil spring and is reciprocative within the tubular housing.

Another feature of this invention is the provision of a lure casting device of the above featured types wherein the coiled spring and attached hollow cylinder are demountably secured to the tubular housing so as to permit easy removal therefrom.

Another feature of this invention is the provision of a lure casting device of the above featured types including a visual indicator for indicating the extent of spring compression thereby enabling the user to accurately determine a length of cast.

Another feature of this invention is the provision of a lure casting device of the above featured types wherein the elongated ratchet is a bar having ratchet teeth which extend into a longitudinal slot in the tubular housing thereby preventing rotation of the attached hollow cylinder and enclosed coil spring.

Another feature of this invention is the provision of a lure casting device of the above featured types wherein the device is easily attached to a fishing rod and including an adjustment mechanism for altering the angle size subtended between the tubular housing and the attached fishing rod thereby allowing a user to obtain any desired trajectory of cast.

Another feature of this invention is the provision with a lure casting device of the above featured types of a lure plug having attached fish hooks adapted to be completely enclosed by a cavity in the lure while ejected from the tubular housing and to protrude from the cavity after having been expelled therefrom.

Another feature of this invention is the provision of a lure casting device of the above featured types wherein the lure plug has a recessed impact surface adapted for contact with an impact surface of the coiled spring and including a fish line connector disposed within the recess which is further adapted to receive the attached fish line and to prevent contact thereof with the coil spring impact surface.

Another feature of this invention is the provision of a lure casting device of the above featured types wherein the lure plug has a circulation channel extending between the lure impact surface and the lure cavity so as to produce a water pressure induced force on the cavity enclosed fish hook upon movement of the lure through the water.

Another feature of this invention is the provision of a lure casting device of the next above featured type wherein the lure plug includes a swivel connection for the fishing line, the fish hooks are pivotally connected to the fish lure and the outer surface of the lure includes spiral grooves which induce rotation of the lure and centrifugal expulsion of the fish hooks upon movement of the lure through a fluid medium.

Another feature of this invention is the provision of a lure casting device of the second above featured type wherein the fish hooks are biased to protrude from the lure cavity and including retaining means for holding the fish hooks within the cavity and wherein the retaining means is adapted for actuation by water contact to release the fish hook from the lure cavity.

Another feature of this invention is the provision of a lure casting device of the above featured type wherein the retaining device comprises a material which will partially disintegrate upon contact with water to thereby release the biased fish hooks.

These and other objects and features of the present invention will become more apparent upon a perusal of the following specification taken in conjunction with the accompanying drawings wherein:

FIG. 1 is a side view, partially in cross section, of a preferred embodiment of the invention;

FIG. 2 is a cross section taken along the lines 2—2 of FIG. 1;

FIG. 3 is a cross sectional view taken along the lines 3—3 of FIG. 1;

FIG. 4 is a rear view of a preferred fishing lure embodiment of the invention;

FIG. 5 is a plan view of the fishing lure shown in FIG. 4;

FIG. 6 is a cross section of the fishing lure shown in FIGS. 4 and 5;

FIG. 7 is a plan view of another preferred fishing lure embodiment of the invention;

FIG. 8 is cross section of the fishing lure shown in FIG. 7;

FIG. 9 is a side view, partially in cross section, of another preferred fishing lure embodiment of the invention; and FIG. 10 is a view of the water actuated retaining device utilized with the fishing lure shown in FIG. 9.

Referring now to FIGS. 1–3 there is shown the elongated tubular housing 11 having the open front end 12. The longitudinal slot 13 extends from the open end 12 through a large portion of the tubular housing 11 which has a rear end closed by the threaded cap 14.

Reciprocatively mounted within the tubular housing 11 is the hollow cylinder 15 having one end closed by the circular plate 16 which provides a propellant impact surface for contacting the fishing lure 17. Partially enclosed by the hollow cylinder 15 is the propellant coiled spring 18. One end of the coiled spring 18 is attached to the bolt 19 which passes through apertures in the tubular housing 11 and is secured thereto by the lock nut 21. The other end of the coiled spring 18 is attached to the eyelet screw 22 which passes through a central aperture in the circular plate 16.

Secured by, for example, welding to the outer surface of the hollow cylinder 15 is the ratchet bar 23 having ratchet teeth which project into the longitudinal slot 13 and thereby prevent rotation of the attached hollow cylinder 15 within the tubular housing 11. The actuating mechanism 24 includes the lever handle 25 pivotally connected between the straddling brackets 26 by the connecting pin 27. The brackets 26 are supported from the tubular housing 11 on opposite sides of the longitudinal slot 13. The driving pawl 28 is pivotally connected to the end of the lever handle 25 by the connecting pin 29 and is adapted to project through the longitudinal slot 13 so as to engage the teeth of the ratchet bar 23. Pivotally attached between supporting brackets 32 by the connecting pin 33 is the trigger pawl 31. The brackets 32 straddle the longitudinal slot 13 and the biasing spring 34 urges the end of the trigger pawl 31 through the slot 13 into engagement with the teeth of the ratchet bar 23. The extended lever portion 35 of the trigger pawl 31 can be actuated against the influence of the biasing spring 34 to disengage the pawl from the ratchet teeth.

Extending from the rear portion of the tubular housing 11 is the attachment arm 41 which is pivotally connected between the rod brackets 42 by the pin 43. The rod brackets 42 include cylindrical portions which encircle the fishing rod 44 and are secured thereto by the wing nut 45. Extending from a forward portion of the tubular housing 11 is the adjustment arm 46 which passes through a slot in an adjustment bracket 47 attached to the fishing rod 44. The wing nut 48 extends through the side wall of the adjustment bracket 47 and engages the surface of the adjustment arm 46.

Actuation of the device is accomplished by initiating a reciprocal movement of the lever handle 25. Each forward motion thereof produces engagement between the driving pawl 28 and the teeth of ratchet 23 forcing the attached cylinder 15 and spring 18 rearwardly in the tubular housing 11. Compensating forward movement of the cylinder and spring is restrained by the engagement of the trigger pawl 31 with the ratchet teeth. This actuating procedure is continued until the desired compression of coiled spring 18 is indicated by the distance numerals printed on the outer surface of hollow cylinder 15 and visible through the aperture 49 in the tubular housing 11. The lure plug 17 is then inserted through the open end 12 of the housing 11 into engagement with the circular plate 16 with the attached fishing line 50 extending from a conventional reel mounted on the rod 44 and through the slot 13 in the housing 11.

A proper trajectory for the cast is obtained by loosening the wing nut 48 and rotating the housing 11 about the pivot 43 to obtain a desired angle between the rod 44 and housing 11. The cast is then made by pointing the rod in the selected direction and pushing the trigger pawl handle portion 35 down against the force of biasing spring 34. This disengages the trigger pawl 31 from the ratchet 23 allowing the coiled spring 18 to expand. Accordingly the attached cylinder 15 and impact surface 16 are driven forward within the housing 11 expelling the lure plug 17 therefrom. The longitudinal slot 13 eliminates the requirement for having within the housing 11 a substantial length of fishing line 50 which could result in entanglement or breakage thereof.

The demountable nut and bolt assembly 19, 21 permits easy removal of the coiled spring 18 and hollow cylinder 15 from the open end of the tubular housing 11. Thus a worn or broken spring can be easily replaced. This feature substantially increases the life expectancy of the casting device.

FIGS. 4–6 are detailed showings of a preferred fishing lure embodiment for use as the lure plug 17 outlined in FIG. 1. The bullet shaped lure plug 51 has a flat rear impact surface 52 interrupted by the circular central opening 53 and the conical shaped counterbore 54. The annular impact surface 52 also includes a plurality of radial slots 55 which communicate with the central opening 53. Supported by cross piece 56 within the central opening 53 is the eyelet 57 to which is attached the fishing line 50. Openings in the forward portion of the plug 51 provide access to a pair of cavities 61 formed therein. Freely mounted within the cylinder 62 is the slide 63 to which are attached the fish hooks 64. The fluid circulation channel 65 extends between the apex of the conical counterbore 54 and the cavities 61.

To use the lure plug 51, the hooks 64 are baited with a suitable bait substance 66 and inserted into the cavities 61 by pushing the slide 63 into the slide cylinder 62. The plug 51 is then inserted into the open end 12 of the tubular housing 11 and expelled in the manner described above. During expulsion the hooks 64 are enclosed within the cavities 61 so as to prevent detrimental contact with the inner surface of the tubular housing 11. Also, the fishing line 50 attached to the eyelet 57 is received by one of the radial slots 55 so as to prevent contact of the line with the circular plate impact surface 16. Once the plug has been ejected and submerged in the fishing waters, the user slowly reels in the fishing line 50. Movement of the plug 51 in the water causes circulation of water into the conical counterbore 54, through the circulation channel 65 and out of the front openings of the plug cavities 61. The force exerted by the circulating water pushes the slide 63 through the cylinder 62 until it contacts the stop rod 67. This movement of the slide 63 results in projection of the baited hooks 64 outside the plug cavities 61 where they can be reached by attracted fish.

FIGS. 7 and 8 show another lure plug embodiment of the invention. The plug 71 has a similar appearance to that of the plug 61 shown in FIGS. 4–6 with a rear impact surface interrupted by a central opening and by radial slots 72. Retained by the bracket 73 is the head 74 of a swivel pin which passes through an aperture in the bracket 73 and terminates with the eyelet 75. The smooth outer surface of the plug 71 is deformed by a plurality of spiral grooves 76 and by slots 79 which receive the fish hooks 77 pivotally attached by pins 78

The lure plug 71 is used in generally the same manner as that described for the lure plug 61 shown in FIGS. 4–6. The hooks 77 are pivoted into the lure slot 79 before insertion of the plug 71 into the tubular housing 11. Upon discharge, however, the force exerted by the air pressure on the spiral grooves 76 causes rotation of the plug 71 about the swivel connection. This rotation produces a centrifugal force which pivots the hooks 77 about the pins 78 and out of the enclosing lure cavities 79. A centrifugal expulsion of the hooks 77 also occurs upon movement of the lure plug 71 through the water upon retraction of the attached fish line 50. An additional advantage of this particular embodiment is that the rotational movement of the lure plug 71 within the water serves as an attraction for fish in the immediate area.

FIGS. 9 and 10 shown another lure plug embodiment which is similar in appearance to that shown in FIGS. 7 and 8. The lure plug 81 has hooks 82 pivotally supported by the pins 84 in the lure cavities 85. However, in this embodiment springs 83 connected to the pivot pins 84 bias the hooks 82 outwardly from the lure cavities 85.

The lure plug embodiment of FIG. 9 requires a slightly different loading procedure than those described above. Before inserting the plug 81 into the tubular housing 11 the hooks 82 are forced into the lure cavity 85 against the influence of the biasing spring 83. The hooks are maintained in this enclosed position by the retainer band 86 which encircles the plug cavities 85 and is joined at its ends with an adhesive substance 88. The retainer band 86 fits into an annular recess 87 in the surface of the plug 81 so as to be free from frictional contact with the inner surface of the tubular housing 11 during expulsion of the plug.

After discharge, the plug 81 and attached fishing line 50 enter the water causing a partial disintegration of the band 86 which is preferably made of a light weight paper material. Subsequent to the rupture of the retainer band 86 the hooks 82 rotate outwardly from the cavities 85 under the influence of the biasing springs 83 so as to be easily reached by attracted fish.

Obviously, many modifications and variations of the present invention are possible in light of the above teachings. It is, therefore, to be understood that within the scope of the appended claims the invention may be practiced otherwise than as specifically described.

What is claimed is:

1. A fishing lure casting device comprising a tubular housing having an open front end adapted to receive and to expel a fishing lure, said tubular housing having a longitudinal slot extending through a substantial portion thereof and terminating at said open front end, a compressible coiled spring attached within the rear portion of said housing and having a surface adapted upon actuation to contact and expel the fishing lure through said open front end, a reciprocative hollow cylinder partially enclosing and attached to said coiled spring, an elongated ratchet attached to said hollow cylinder, a driving pawl adapted to drive said elongated ratchet in a reverse direction and having a lever handle located outside said housing, and a trigger pawl adapted in a normally biased position to prevent forward motion of said elongated ratchet and in a release position to permit forward motion of said elongated ratchet and attached hollow cylinder and expansion of said coiled spring.

2. A fishing lure casting device according to claim 1 including demountable securing means permitting removal of said coiled spring from said housing.

3. A fishing lure casting device according to claim 2 including indicating means adapted to give a visual indication of the extent to which said coiled spring is compressed.

4. A fishing lure casting device according to claim 3 wherein said elongated ratchet is a ratchet bar attached to the outer surface of said hollow cylinder and having ratchet teeth which extend into a longitudinal slot in said housing thereby restricting rotation movement of said hollow cylinder.

5. A fishing lure casting device according to claim 4 including attachment means for attaching said housing to a fishing rod.

6. A fishing lure casting device according to claim 5 wherein said attachment means is adjustable so as to permit altering of the angle size subtended by said housing and the attached fishing rod.

7. A fishing device comprising a tubular housing having an open front end, said tubular housing having a longitudinal slot extending through a substantial portion thereof and terminating at said open front end, a propellent means positioned within said housing and adapted upon actuation to expel through said open front end a fishing lure disposed within said housing, actuation means for actuating said propellent means, and a fish lure adapted for insertion through said open front end into said housing, said longitudinal slot in said housing adapted to receive a fishing line attached to said fish lure, and a fish hook attached to said fish lure and adapted to be completely enclosed by a cavity therein while positioned within said housing and to protrude from said cavity after being expelled from said housing.

8. A fishing lure casting device according to claim 7 wherein said propellent means includes a compressible coiled spring attached within the rear portion of said housing and having an impact surface adapted to contact the fishing lure, and said actuation means includes a ratchet assembly adapted to compress said coiled spring.

9. A fishing lure casting device according to claim 8 wherein said ratchet assembly includes an elongated ratchet operatively connected to said coiled spring, a driving pawl adapted to drive said elongated ratchet in a reverse direction and having a lever handle located outside said housing, and a trigger pawl adapted in a normally biased position to prevent forward motion of said elongated ratchet and in a release position to permit forward motion of said elongated ratchet and attached coiled spring.

10. A fishing lure casting device according to claim 9 wherein said coiled spring is partially enclosed by and attached to a hollow cylinder reciprocative within said housing and said elongated ratchet is attached to said hollow cylinder.

11. A fishing lure casting device according to claim 10 including demountable securing means permitting removal of said coiled spring from said housing.

12. A fishing lure casting delivec according to claim 11 including indicating means adapted to give a visual indication of the extent to which said coiled spring is compressed.

13. A fishing lure casting device according to claim 12 wherein said elongated ratchet is a ratchet bar attached to the outer surface of said hollow cylinder and having ratchet teeth which extend into a longitudinal slot in said housing thereby restricting rotation movement of said hollow cylinder.

14. A fishing lure casting device according to claim 13 including attachment means for attaching said housing to a fishing rod.

15. A fishing lure casting device according to claim 14 wherein said attachment means is adjustable so as to permit altering of the angle size subtended by said housing and the attached fishing rod.

16. A fishing device according to claim 7 wherein said fish lure has an impact surface adapted for contact with an impact surface of said propellent means, said lure impact surface having an indented portion and a fish line connector disposed therein, and wherein said lure indented portion is adapted to receive the fishing line so as to prevent contact thereof with said propellent means impact surface.

17. A fishing device according to claim 16 wherein said fish lure has a circulation channel extending between said lure impact surface and said cavity so as to provide a water pressure induced force on said cavity enclosed fish hook upon movement of said fish lure through the water.

18. A fishing device according to claim 16 wherein said fish line connector is a swivel connection, said fish hook is pivotally connected to said fish lure, the outer surface of said fish lure includes spiral grooves adapted to produce rotation of said lure and centrifugal expulsion of said fish hook upon movement of said lure through a fluid medium.

19. A fishing device according to claim 16 wherein said fish hook is biased to protrude from said cavity and including retaining means for holding said fish hook within said cavity, said retaining means adapted to be actuated by contact with water so as to allow the biasing to force said fish hook from said cavity.

20. A fishing device according to claim 19 wherein said retaining means comprises a material which will at least partially disintegrate upon contact with water.

References Cited

UNITED STATES PATENTS

| | | | |
|---|---|---|---|
| 1,598,323 | 8/1926 | Spencer | 43—19 |
| 2,305,176 | 12/1942 | Littman | 43—19 |
| 2,815,212 | 12/1957 | Hall | 124—27 X |
| 3,001,316 | 9/1961 | Fefelov | 43—19 |
| 3,059,630 | 10/1962 | Oreskey | 43—19 X |

SAMUEL KOREN, *Primary Examiner.*

D. J. LEACH, *Assistant Examiner.*